(12) United States Patent
Benjamin et al.

(10) Patent No.: US 10,887,557 B2
(45) Date of Patent: Jan. 5, 2021

(54) EJECTION SEAT OCCUPANT CAMERA SYSTEM

(71) Applicant: AMI INDUSTRIES, INC, Colorado Springs, CO (US)

(72) Inventors: Jeff Benjamin, Colorado Springs, CO (US); Matthew D. Salois, Berwick, ME (US)

(73) Assignee: Raytheon Technologies Corporation, Farmington, CT (US)

(*) Notice: Subject to any disclaimer, the term of this patent is extended or adjusted under 35 U.S.C. 154(b) by 0 days.

(21) Appl. No.: 16/368,626

(22) Filed: Mar. 28, 2019

(65) Prior Publication Data

US 2020/0314387 A1    Oct. 1, 2020

(51) Int. Cl.
*H04N 7/18*     (2006.01)
*B64D 25/10*   (2006.01)
*H04N 5/77*     (2006.01)

(52) U.S. Cl.
CPC .............. *H04N 7/183* (2013.01); *B64D 25/10* (2013.01); *H04N 5/77* (2013.01)

(58) Field of Classification Search
CPC .................................................... B64D 25/10
See application file for complete search history.

(56) References Cited

U.S. PATENT DOCUMENTS

| | | | | |
|---|---|---|---|---|
| 4,580,982 A | * | 4/1986 | Ruppert | G09B 9/165 434/30 |
| 5,240,207 A | * | 8/1993 | Eiband | G05D 1/0038 244/190 |
| 6,130,616 A | * | 10/2000 | Sizemore | G08B 13/149 340/573.1 |
| 7,158,167 B1 | | 1/2007 | Yerazunis et al. | |
| 8,730,388 B2 | | 5/2014 | Osborn | |
| 2002/0186180 A1 | | 12/2002 | Duda | |
| 2005/0143172 A1 | * | 6/2005 | Kurzweil | A63F 13/12 463/30 |
| 2008/0175400 A1 | * | 7/2008 | Napoletano | H04R 29/00 381/58 |
| 2015/0229813 A1 | * | 8/2015 | Isaac-Lowry | H04N 5/2252 348/376 |
| 2017/0140666 A1 | * | 5/2017 | Kennair, Jr. | F16M 13/04 |

* cited by examiner

*Primary Examiner* — Hung Q Dang
(74) *Attorney, Agent, or Firm* — Snell & Wilmer L.L.P.

(57) ABSTRACT

An occupant camera system for an aircraft ejection assembly may comprise a fixed structure and a camera mounted to the fixed structure. A digital video recorder may be mounted to the fixed structure and electrically coupled to the camera. A switch may be electrically coupled to the digital video recorder, and a battery may be electrically coupled to the switch.

18 Claims, 4 Drawing Sheets

EJECTION SEAT OCCUPANT CAMERA SYSTEM

FIELD

The present disclosure relates to ejection seats, and more specifically, to a compact occupant camera system for ejection seat testing.

BACKGROUND

Ejection seats are designed to expel pilots from an aircraft. Simulations may be performed to test the ejection seats and ejection systems. Current simulations generally employ cameras to document and record the simulation. These cameras are typically located away from the ejection seat so false weight (i.e., weight which would not be present during an actual emergency ejection) is not added to the ejection seat during the simulation and to avoid creating an interference in the path of the ejection seat. With the cameras located away from the ejection seat, data and/or coverage generated from the seat occupant's point of view is not readily attainable.

SUMMARY

An occupant camera system for an aircraft ejection assembly is disclosed herein. In accordance with various embodiments, the occupant camera system may comprise a fixed structure and a camera mounted to the fixed structure. A digital video recorder may be mounted to the fixed structure and electrically coupled to the camera. A switch may be electrically coupled to the digital video recorder. A battery may be electrically coupled to the switch.

In various embodiments, a pin may be coupled to the switch. A translation of the pin may be configured to actuate the switch between an off-position and an on-position. In various embodiments, the switch may comprise a circuit, and the translation of the pin may be configured to actuate the circuit from an open circuit to a closed circuit. In various embodiments, a pull cord may be attached to the pin.

In various embodiments, the fixed structure may comprise a mannequin. The camera may be mounted to a visor of the mannequin and the digital video recorder may be mounted to at least one of a head of the mannequin or a helmet of the mannequin.

In various embodiments, at least one of the switch or the battery may be mounted to the helmet of the mannequin. In various embodiments, the mannequin may comprise a flight suit, and at least one of the switch or the battery may be located within a pocket of the flight suit.

An aircraft ejection assembly for an ejection simulation is also disclosed herein. In accordance with various embodiments, the ejection assembly may comprise an ejection seat, a mannequin configured to be supported by the ejection seat, and an occupant camera system coupled to at least one of the mannequin or the ejection seat. The occupant camera system may comprise a camera mounted on the at least one of the mannequin or the ejection seat and a digital video recorder mounted on the at least one of the mannequin or the ejection seat. The digital video recorder may be electrically coupled to the camera. The occupant camera system may further comprise a switch electrically coupled to the digital video recorder and a battery electrically coupled to the switch.

In various embodiments, the occupant camera system may further comprise a pin coupled to the switch. A translation of the pin may be configured to actuate the switch between an off-position and an on-position. In various embodiments, the switch may comprise a circuit, and the translation of the pin may be configured to actuate the circuit from an open circuit to a closed circuit.

In various embodiments, the occupant camera system may further comprise a pull cord attached to the pin.

In various embodiments, the mannequin may comprise a helmet and a visor attached to the helmet. The camera may be coupled to the visor and the digital video recorder may be coupled to the helmet. In various embodiments, at least one of the switch or the battery may be coupled to the helmet. In various embodiments, the mannequin may further comprise a flight suit, and at least one of the switch or the battery may be located within a pocket of the flight suit.

A method for recording for an ejection simulation is also disclosed herein. In accordance with various embodiments, the method may comprise coupling an occupant camera system to a mannequin. The occupant camera system may comprise a camera, a digital video recorder electrically coupled to the camera, a switch electrically coupled to the digital video recorder, and a battery electrically coupled to the switch. The method may further comprise translating the switch to an on-position, and initiating an ejection sequence.

In various embodiments, coupling the occupant camera system to the mannequin may comprise mounting the digital video recorder to a helmet of the mannequin and mounting the camera to a visor coupled to the helmet.

In various embodiments, the occupant camera system may further comprise a pin coupled to the switch, and translating the switch to the on-position may comprise translating the pin.

In various embodiments, the occupant camera system may further comprise a pull cord coupled to the pin, and translating the pin may comprise translating the pull cord.

In various embodiments, the switch may comprise a circuit, and translating the switch to the on-position may comprise closing the circuit.

In various embodiments, the method may further comprise translating the switch to an off-position by locating the pin between a first portion the circuit and a second portion of the circuit.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
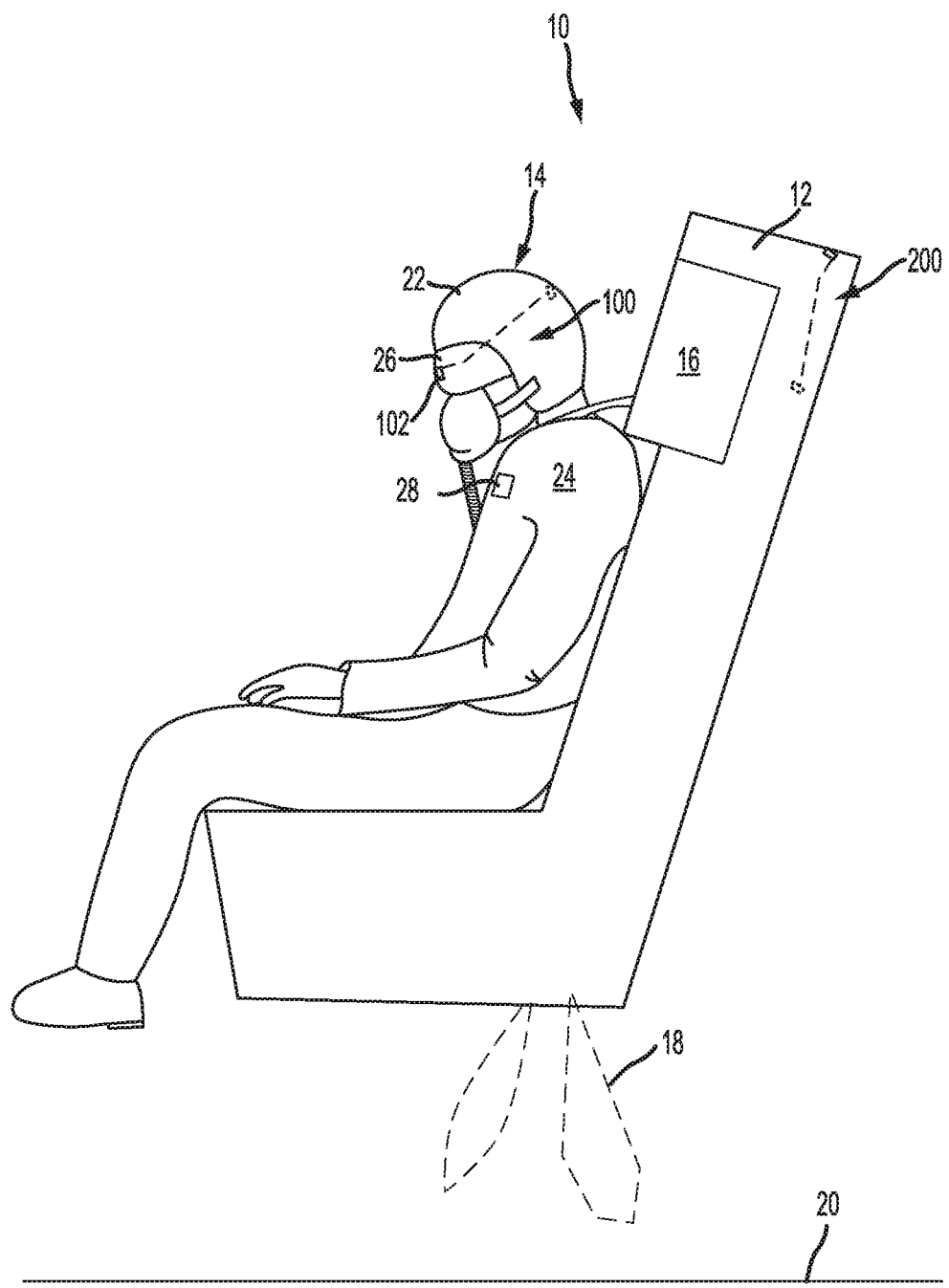
FIG. 1 illustrates an ejection seat assembly having an occupant camera system, in accordance with various embodiments.

With reference to FIG. 1, an aircraft ejection assembly 10 is shown, in accordance with various embodiments. Aircraft ejection assembly 10 may be used for ejection sequence simulations. For example, aircraft ejection assembly 10 may be employed in simulations that mimic an ejection seat being ejected from an aircraft and an occupant of the ejection seat being separated from the ejection seat in response to deployment of a parachute assembly which may be stored, at least partially, within the ejection seat.

Aircraft ejection assembly 10 may include an ejection seat 12 and a mannequin 14. Aircraft ejection assembly 10 may include a parachute assembly 16 configured to deploy from ejection seat 12. Mannequin 14 may be separated from ejection seat 12 in response to deployment of parachute assembly 16. Aircraft ejection assembly 10 may include a propulsion system 18 configured to propel ejection seat 12 and mannequin 14 away from a ground or other surface 20 (for example, away from a surface mimicking the floor of a cockpit).

In various embodiments, mannequin 14 may include a helmet 22 and a flight suit 24. A visor (or eye protector) 26 may be located over and correspond to a location of the eyes of a person wearing helmet 22. Visor 26 may be attached to helmet 22.

In accordance with various embodiments, aircraft ejection assembly 10 includes an occupant camera system 100. Occupant camera system 100 includes a camera 102. Camera 102 may be a compact, lightweight, high speed/resolution camera. Camera 102 is mounted to a fixed structure. For example, camera 102 may be mounted on mannequin 14 or ejection seat 12. In this regard, the fixed structure may be visor 26 of mannequin 14. In various embodiments, the fixed structure may be helmet 22 or a head or other part of mannequin 14. In various embodiments, the fixed structure may be a camera mount attached to visor 26, helmet 22, or mannequin 14. In various embodiments, the fixed structure may comprise a textile component, for example, a skull cap worn by mannequin 14. In various embodiments, and as described in further detail below, camera 102 may be mounted on mannequin 14 in a location corresponding to the field of view of mannequin 14, such that occupant camera system 100 may record an ejection simulation from the point of view of an ejection seat occupant. For example, occupant camera system 100 may be employed to record a pilot's point of view from ejection system initiation to ground impact.

Figure 2A:
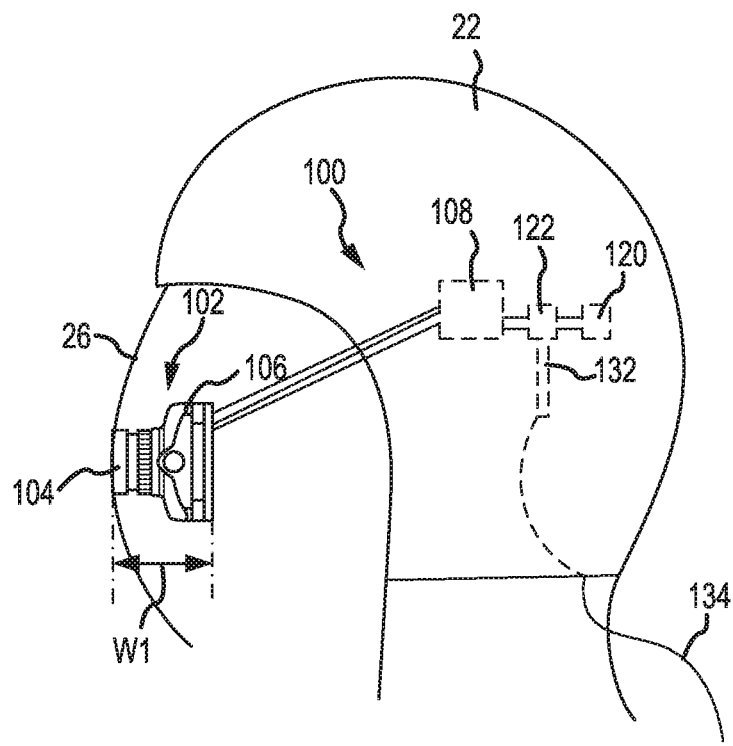
FIG. 2A illustrates a camera, of an occupant camera system, coupled at mannequin eyelevel, in accordance with various embodiments.
Figure 2B:
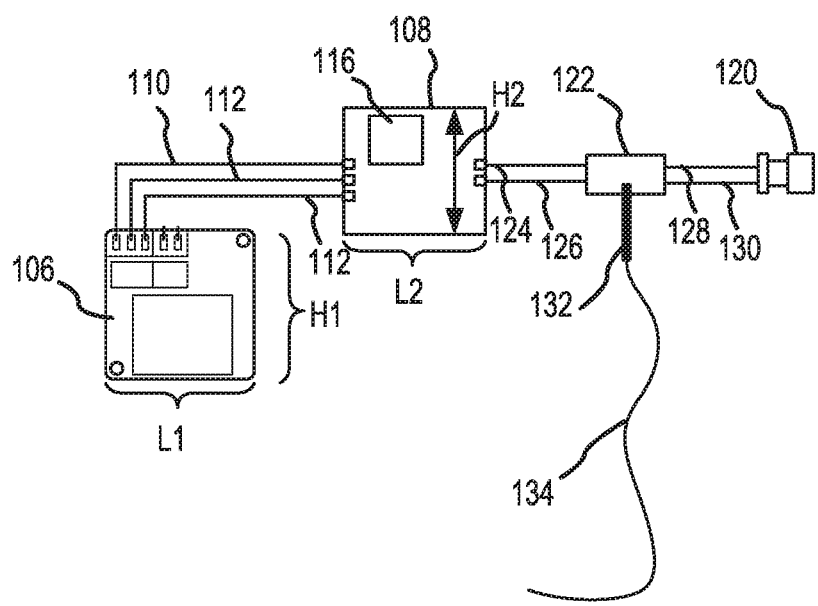
FIG. 2B illustrates an occupant camera system for an ejection seat, in accordance with various embodiments.

Referring now to FIGS. 2A and 2B, and with continued reference to FIG. 1, additional details of occupant camera system 100 are illustrated, in accordance with various embodiments. Occupant camera system 100 includes camera 102. In various embodiments, camera 102 may be coupled to visor 26 of mannequin 14. A location of camera 102 may correspond to a location of the eyes of a person wearing helmet 22. While FIG. 2A shows camera 102 attached to visor 26, it is further contemplated and understood that camera 102 may be attached to other locations on mannequin 14 and/or on ejection seat 12. The location of camera 102 is selected based on the desired field of view to be recorded.

Camera 102 includes a lens 104 and a camera controller 106. Camera controller 106 may include and communicate with one or more processors and one or more tangible, non-transitory memories and may be capable of implementing logic. The processor can be a general purpose processor, a digital signal processor (DSP), an application specific integrated circuit (ASIC), a field programmable gate array (FPGA) or other programmable logic device, discrete gate or transistor logic, discrete hardware components, or a combination thereof.

In various embodiments, camera 102 may be a digital camera. In various embodiments, camera 102 may have any suitable resolution, for example 640×480 pixels, 1024×768 pixels, 1280×720 pixels, 1920×1080 pixels, 3840×2160 pixels, and/or the like. Camera 102 may have any suitable frame rate, for example 24 frames per second (FPS), 30 FPS, 60 FPS, and/or the like. Camera 102 may employ any suitable scanning method, for example progressive, interlaced, and/or the like. Camera 102 is compact and light weight. For example, a weight of camera 102 may be between 3.5 grams (g) and 8.5 g (0.12 ounces and 0.3 ounces). In various embodiments, a weight of camera 102 may be 5.5 g (0.19 ounces). Camera 102 may have a width W1 of between 15 millimeters (mm) and 25 mm (0.59 inches and 0.98 inches). In various embodiments, width W1 may be 18 mm (0.71 inches). Camera 102 may have a length L1 of between 15 mm and 25 mm (0.59 inches and 0.98 inches). In various embodiments, length L1 may be 19 mm (0.75 inches). Camera 102 may have a height H1 of between 15 mm and 25 mm (0.59 inches and 0.98 inches). In various embodiments, height H1 may be 19 mm (0.75 inches). In various embodiments, camera 102 may comprise a digital camera which is available under the trade name RUN-CAM®, available from the RunCam Corporation, Hong Kong Flat/RM 4 18/F, 234 Aberdeen Main Road, Hong Kong.

Occupant camera system 100 further includes a digital video recorder (DVR) 108. DVR 108 may include and communicate with one or more processors and one or more tangible, non-transitory memories and may be capable of implementing logic. The processor can be a general purpose processor, a digital signal processor (DSP), an application specific integrated circuit (ASIC), a field programmable gate array (FPGA) or other programmable logic device, discrete gate or transistor logic, discrete hardware components, or a combination thereof. DVR 108 may employ any suitable storage component, for example a hard disk drive, a solid state drive, and/or the like. DVR 108 is configured to record and store images from camera 102. In various embodiments, DVR 108 may store images from camera 102 on a removable secure digital (SD) memory card 116.

DVR 108 is compact and light weight. For example, a weight of DVR 108 may be between 2.5 g and 5.0 g (0.09 ounces and 0.18 ounces). In various embodiments, a weight of DVR 108 may be 3.5 g (0.12 ounces). DVR 108 may have a length L2 of between 15 mm and 35 mm (0.59 inches and 1.38 inches). In various embodiments, length L2 may be 25 mm (0.98 inches). DVR 108 may have a height H2 of between 15 mm and 35 mm (0.59 inches and 1.38 inches). In various embodiments, height H2 may be 25 mm (0.98 inches). In various embodiments, DVR 108 may comprise a mini first person view digital video recorder which is available under the trade name RUNCAM®, available from the RunCam Corporation, Hong Kong Flat/RM 4 18/F, 234 Aberdeen Main Road, Hong Kong.

DVR 108 is electrically coupled to camera controller 106. For example, a wire, or cable, 110 provides a positive voltage between DVR 108 and camera 102. A wire, or cable, 112 provides a negative voltage (or ground) between DVR 108 and camera 102. A wire, or cable, 114 provides a video connection between DVR 108 and camera 102.

In various embodiments, DVR 108 is coupled to a fixed structure, for example, an interior surface of helmet 22, a portion of mannequin 14 located within helmet 22, and/or a DVR mount coupled to helmet 22 or mannequin 14. Locating DVR 108 within helmet 22 allows helmet 22 to protect DVR 108 during ground impact (i.e., when mannequin 14 contacts the ground), thereby reducing a likelihood of damage to DVR 108. While FIG. 2A shows DVR 108 attached to helmet 22, it is further contemplated and understood that DVR 108 may be attached to other locations on mannequin 14 and/or on ejection seat 12. For example, in various embodiments, DVR 108 may be located within a pocket 28 of flight suit 24.

Occupant camera system 100 may further include a battery 120 and a switch 122. Battery 120 is configured to supply power (voltage) to occupant camera system 100. In various embodiments, battery 120 may comprise a 5 volt battery. DVR 108 is electrically coupled to battery 120 via switch 122. Stated differently, switch 122 is located between DVR 108 and battery 120. A wire, or cable, 124 provides a positive voltage between DVR 108 and switch 122, and a wire, or cable, 126 provides a negative voltage (or ground) between DVR 108 and switch 122. A wire, or cable, 128 provides a positive voltage between battery 120 and switch 122, and a wire, or cable, 130 provides a negative voltage (or ground) between battery 120 and switch 122. As described in further detail below, switch 122 is configured to regulate the flow of current from battery 120 to DVR 108 and camera 102 such that when switch 122 is in an off-position, current does not flow to DVR 108 and camera 102 and when switch 122 is in an on-position, current flows to and powers DVR 108 and camera 102.

In various embodiments, a pin 132 may configured to actuate switch 122 between the off-position and the on-position. A pull cord 134 may be attached to pin 132. Pull cord 134 allows an operator to translate pin 132, thereby actuating switch 122 from the off-position to the on-position. For example, in various embodiments, "pulling," or otherwise translating, pin 132 in a direction away from switch 122 (i.e., in the direction of arrow 133 in FIG. 3B) may actuate switch 122 to the on-position.

Figure 3A:
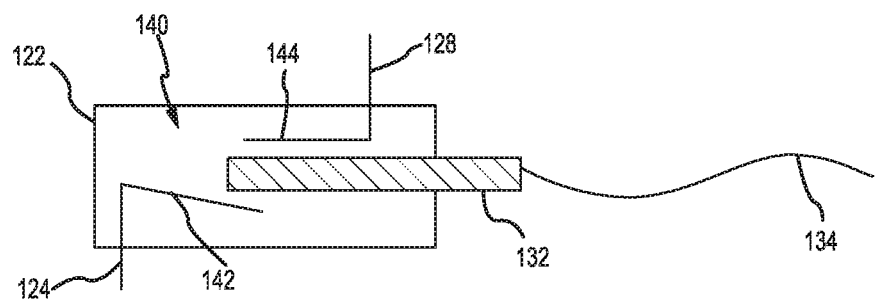
FIG. 3A illustrates a circuit switch, of an occupant camera system, in an off-position, in accordance with various embodiments.
Figure 3B:
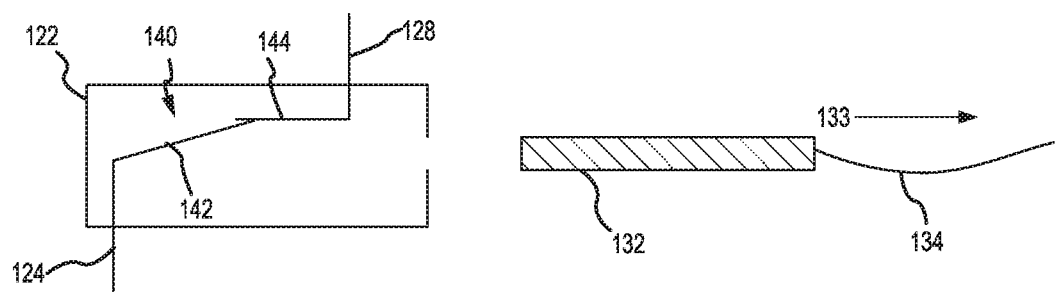
FIG. 3B illustrates a circuit switch, of an occupant camera system, in an on-position, in accordance with various embodiments.

With reference to FIGS. 3A and 3B, further details of switch 122 are illustrated. In various embodiments, switch 122 includes a circuit 140. FIG. 3A shows switch 122 in the off-position. In the off-position, circuit 140 is open (i.e., circuit 140 is an open circuit). In this regard, pin 132 is located between a first portion 142 and a second portion 144 of circuit 140. Pin 132 interrupts the connection between first portion 142 and second portion 144 such that current is prevented or blocked from flowing between wires 124 and 128 (i.e., between battery 120 and DVR 108). Pin 132 includes an electrically insulating material. For example, pin 132 may comprise polyvinyl chloride (PVC), polymer (e.g., polystyrene), resin, wood, or other electrically insulating material.

FIG. 3B shows switch 122 in the on-position. In the on-position, circuit 140 is closed (i.e., circuit 140 is a closed circuit). In this regard, pin 132 is removed from between first portion 142 and second portion 144 of circuit 140. With pin 132 removed, first portion 142 contacts second portion 144 such that current flows between wires 124 and 128 (i.e., between battery 120 and DVR 108). In various embodiments, pin 132 may be removed from circuit 140 by pulling pull cord 134.

With combined reference to FIG. 1 and FIG. 2A, in various embodiments, battery 120 and switch 122 may be coupled to a fixed structure, for example, an interior surface of helmet 22, a portion of mannequin 14 located within helmet 22, or a mount coupled to helmet 22 or mannequin 14. Locating battery 120 and switch 122 within helmet 22 allows helmet 22 to protect battery 120 and switch 122 during ground impact, thereby reducing a likelihood of damage to battery 120 and switch 122. While FIG. 2A shows battery 120 and switch 122 attached to helmet 22, it is further contemplated and understood that battery 120 and/or switch 122 may be attached to other locations on mannequin 14 and/or on ejection seat 12. For example, in various embodiments, battery 120 and/or switch 122 may be located within pocket 28 of flight suit 24.

Pull cord 134 provides a relatively safe and simple way to provide power to camera 102 and thus begin recording. When a simulation is complete, pin 132 may be reinstalled in switch 122 to stop recording (i.e., to interrupt the flow of current between first portion 142 and second portion 144 of circuit 140 in FIG. 3A). Pull cord 134 may allow occupant camera system 100 to be safely employed in simulations using explosives and other energetic materials. In this regard, a length of pull cord 134 may be selected to allow an operator to be located a safe distance away from ejection seat 12. For example, recording via occupant camera system 100 may be initiated by an operator pulling pull cord 134 while standing 10.0 to 20.0 feet (3.0 meters (m) to 6.1 m) from ejection seat 12.

Occupant camera system 100 may provide a video record from a view point that was previously unachievable. The modularity of the design and the small size of camera 102 lends itself to multiple locations on mannequin 14 and/or on ejection seat 12. In various embodiments, a total weight of occupant camera system 100 may be less than 25 g (0.88 ounces). For example, a weight of occupant camera system 100 may be between 9 g and 21 g. Subsystems of aircraft ejection assembly 10, where it was previously impractical to film (e.g., due to weight of the camera or interference between the camera and the ejection systems) may be captured by occupant camera system 100. The video captured by occupant camera system 100 may also be used to train pilots by providing a first person view from initiation of the ejection sequence through parachute deployment and ground impact.

In various embodiments, one or more occupant camera system(s) 200 (FIG. 1) may be mounted to ejection seat 12 to film various subsystems of ejection seat 12. Occupant camera system 200 may be similar to occupant camera system 100. In this regard, occupant camera system 200 includes a camera similar to camera 102 and a DVR similar to DVR 108 and electrically coupled to the camera. Occupant camera system 200 further includes a battery configured to provide power to the DVR and the camera, and a switch similar to switch 122 (i.e., a switch configured to regulate the flow of current from the battery to the DVR and camera of occupant camera system 200). The switch of occupant camera system 200 may be actuated between an off-position and an on-position by translating a pull cord and a pin similar to pull cord 134 and pin 132 of occupant camera system 100.

Figure 4A:
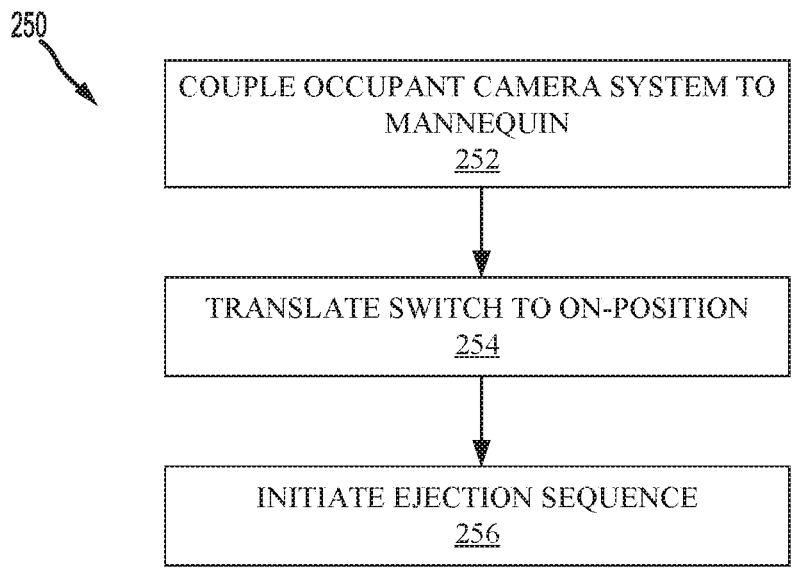
FIGS. 4A and 4B illustrate a method for recording an ejection simulation using an occupant camera system, in accordance with various embodiments.
Figure 4B:
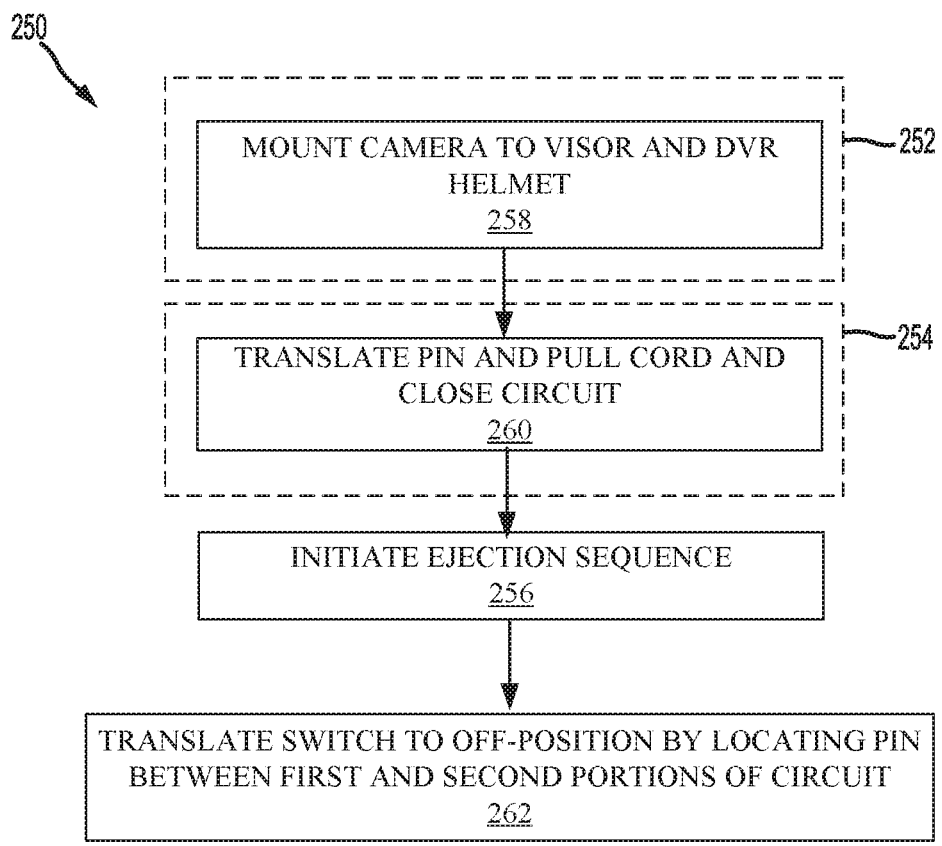

FIGS. 4A and 4B show a method 250 for recording for an ejection simulation. In accordance with various embodiments, and with combined reference to FIG. 4A and FIGS. 2A and 2B, method 250 may comprise coupling occupant camera system 100 to mannequin 14 (step 252), translating switch 122 to an on-position (step 254), and initiating an ejection sequence (step 256).

With combined reference to FIG. 4B and FIGS. 2A and 2B, in various embodiments, step 252 may include mounting camera 102 to visor 26 and DVR 108 to helmet 22 (step 258). In various embodiments, step 254 may include translating pin 132 and pull cord 134 (step 260). In various embodiments, step 254 may comprise closing circuit 140, with momentary reference to FIGS. 3A and 3B.

In various embodiments, method 250 may further comprise translating switch 122 to an off-position by locating pin 132 between first portion 142 and second portion 144 of circuit 140 (step 262).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An occupant camera system for an aircraft ejection assembly, the occupant camera system comprising:
   a fixed structure;
   a camera mounted to the fixed structure;
   a digital video recorder mounted to the fixed structure and electrically coupled to the camera;
   a switch electrically coupled to the digital video recorder;
   a pin removably coupled to the switch;
   a pull cord attached to the pin and configured to remove the pin from the switch, wherein the pull cord is configured to extend past an explosion generated upon initiation of an ejection simulation; and
   a battery electrically coupled to the switch.

2. The occupant camera system of claim 1, wherein removal of the pin from the switch translates the switch from an off-position to an on-position.

3. The occupant camera system of claim 2, wherein the switch comprises a circuit, and wherein removal of the pin from the switch is configured to actuate the circuit from an open circuit to a closed circuit.

4. The occupant camera system of claim 1, wherein the fixed structure comprises a mannequin, and wherein the camera is mounted to a visor of the mannequin and the digital video recorder is mounted to at least one of a head of the mannequin or a helmet of the mannequin.

5. The occupant camera system of claim 4, wherein at least one of the switch or the battery is mounted to the helmet of the mannequin.

6. The occupant camera system of claim 4, wherein the mannequin comprises a flight suit, and wherein at least one of the switch or the battery is located within a pocket of the flight suit.

7. The occupant camera system of claim 1, wherein pull cord is at least 10 feet long.

8. An aircraft ejection assembly for an ejection simulation, the aircraft ejection assembly comprising:
   an ejection seat;
   a mannequin configured to be supported by the ejection seat; and
   an occupant camera system coupled to at least one of the mannequin or the ejection seat, the occupant camera system comprising:
      a camera mounted on the at least one of the mannequin or the ejection seat;
      a digital video recorder mounted on the at least one of the mannequin or the ejection seat, wherein the digital video recorder is electrically coupled to the camera;
      a switch electrically coupled to the digital video recorder;
      a pin removably coupled to the switch;
      a pull cord attached to the pin and configured to remove the pin from the switch, wherein the pull cord is configured to extend past an explosion generated upon initiation of the ejection simulation; and
      a battery electrically coupled to the switch.

9. The aircraft ejection assembly of claim 8, wherein removal of the pin from the switch is configured to actuate the switch from an off-position to an on-position.

10. The aircraft ejection assembly of claim 9, wherein the switch comprises a circuit, and wherein removal of the pin from the switch is configured to actuate the circuit from an open circuit to a closed circuit.

11. The aircraft ejection assembly of claim 10, wherein the mannequin comprises a helmet and a visor attached to the helmet, and wherein the camera is coupled to the visor and the digital video recorder is coupled to the helmet.

12. The aircraft ejection assembly of claim 11, wherein at least one of the switch or the battery is coupled to the helmet.

13. The aircraft ejection assembly of claim 11, wherein the mannequin further comprises a flight suit, and wherein at least one of the switch or the battery is located within a pocket of the flight suit.

14. The aircraft ejection assembly of claim 8, wherein pull cord is at least 10 feet long.

15. A method for recording an ejection simulation, comprising:
   coupling an occupant camera system to a mannequin, the occupant camera system comprising:
      a camera;
      a digital video recorder electrically coupled to the camera;
      a switch electrically coupled to the digital video recorder;
      a pin removably coupled to the switch;
      a pull cord attached to the pin; and
      a battery electrically coupled to the switch;
   translating the switch to an on-position by pulling the pull cord and removing the pin from the switch; and
   initiating an ejection sequence, wherein a length of the pull cord is selected to extend past an explosion generated upon initiation of the ejection sequence.

16. The method of claim 15, wherein coupling the occupant camera system to the mannequin comprises:
   mounting the digital video recorder to a helmet of the mannequin; and
   mounting the camera to a visor coupled to the helmet.

17. The method of claim 15, wherein the switch comprises a circuit, and wherein translating the switch to the on-position comprises closing the circuit.

18. The method of claim 17, further comprising translating the switch to an off-position by locating the pin between a first portion the circuit and a second portion of the circuit.

* * * * *